US007505473B2

(12) United States Patent
Paavolainen

(10) Patent No.: US 7,505,473 B2
(45) Date of Patent: Mar. 17, 2009

(54) TRANSMISSION OF BROADCAST PACKETS IN SECURE COMMUNICATION CONNECTIONS BETWEEN COMPUTERS

(75) Inventor: Santeri Paavolainen, Helsinki (FI)

(73) Assignee: SafeNet, Inc., Belcamp, MD (US)

( * ) Notice: Subject to any disclaimer, the term of this patent is extended or adjusted under 35 U.S.C. 154(b) by 904 days.

(21) Appl. No.: 10/611,358

(22) Filed: Jun. 30, 2003

(65) Prior Publication Data

US 2004/0057430 A1  Mar. 25, 2004

(30) Foreign Application Priority Data

Jun. 28, 2002  (FI)  .................................. 20021272

(51) Int. Cl.
- *H04L 12/28* (2006.01)
- *H04L 12/56* (2006.01)
- *H04J 3/16* (2006.01)
- *H04J 3/22* (2006.01)

(52) U.S. Cl. ....................................... 370/401; 370/466
(58) Field of Classification Search ......... 370/389–390, 370/400, 401, 466
See application file for complete search history.

(56) References Cited

U.S. PATENT DOCUMENTS

| 6,112,251 | A  | * | 8/2000  | Rijhsinghani ................ 709/245 |
| 7,286,467 | B1 | * | 10/2007 | Sylvain ........................ 370/216 |
| 2001/0034788 | A1 | * | 10/2001 | McTernan et al. ........... 709/232 |
| 2003/0058274 | A1 | * | 3/2003  | Hill et al. ..................... 345/751 |
| 2004/0030804 | A1 | * | 2/2004  | Wiget et al. ................. 709/245 |
| 2005/0100016 | A1 | * | 5/2005  | Miller et al. ................. 370/390 |

FOREIGN PATENT DOCUMENTS

| WO | WO 00-56018 A1 | 9/2000 |
| WO | WO 01-43359 A3 | 6/2001 |
| WO | WO 02-39657 A1 | 5/2002 |

OTHER PUBLICATIONS

Mogul, Jeffrey, "RFC 919—Broadcasting Internet Datagrams," Oct. 1984, pp. 1-9 & link list.
Plummer, David C., "RFC 826—An Ethernet Address Resolution Protocol . . . ", Nov. 1982, pp. 1-10 & link list.
Patel, B. et al., "draft-ietf-ipsec-dhcp-13—DHCPv4 Configuration of IPsec Tunnel Mode," Jun. 2001, pp. 1-17.

* cited by examiner

*Primary Examiner*—Kevin C Harper
(74) *Attorney, Agent, or Firm*—Drinker, Biddle & Reath, LLP

(57) ABSTRACT

A method and devices are provided for handling a broadcast packet in a computer (131, 132, 612, 622, 632, 711, 721, 731, 741, 1111, 1112, 1301) that has an IPsec-protected connection to a part (121, 122, 141, 732, 733, 742, 743, 1113, 1114) of a logical network segment (101, 601, 701, 1101) within which the broadcast packet should be distributed. The IPsec protection specifies, what kinds of packets are acceptable for transmission over the IPsec-protected connection. The broadcast packet is encapsulated (204, 311, 508, 835, 838, 840, 842, 849, 852, 909) into a form that is acceptable for transmission over the IPsec-protected connection. It is then transmitted (205, 206, 312, 509, 836, 839, 841, 843, 850, 853, 910) to the part of the logical network segment through the IPsec-protected connection.

2 Claims, 10 Drawing Sheets

TRANSMISSION OF BROADCAST PACKETS IN SECURE COMMUNICATION CONNECTIONS BETWEEN COMPUTERS

TECHNICAL FIELD

The invention concerns generally the technology of arranging the transmission of various types of packets between computers that are coupled to a packet-switched communications network. Especially the invention provides an answer to the question, how security and broadcasting capability can be simultaneously accounted for in such a packet-switched communications network.

BACKGROUND OF THE INVENTION

The Internet Protocol, or IP for short, is a widely used protocol that defines the structure and handling of so-called IP packets in packet-switched communications networks between computers. An IP packet consists of a header and a payload part, of which the header includes information that specifies the intended way of handling the packet while the payload part contains some (hopefully) useful payload data. Important parts of the IP packet header are the source and destination addresses that specify, where did the packet originate from and who is the intended recipient.

According to IP, it is possible to transmit so-called broadcast packets where a broadcast address of a network segment is used as the destination address. Such packets are meant to reach every computer that belongs to the network segment in question. Typical users of broadcast packets are instant messaging protocols, some protocols that are used for detecting whether there are peer nodes present in the network segment, and games. The essential details of using broadcast packets are available to the public in the document RFC 919, published in October 1984 by the Internet Society and IETF, where RFC comes from Request For Comments and IETF is Internet Engineering Task Force. Said document is incorporated herein by reference.

On the other hand a known feature of packet-switched computer networks is the constantly growing need for security. At the priority date of this patent application the de facto standard of securing IP-based communications is the IPsec (Internet Protocol security) protocol suite, a central concept of which is the SA (Security Association). An SA is a simplex logical "connection" that affords security services to the traffic carried by it. Setting up an SA invariably involves authentication of the communicating parties. As already the title suggests, an SA involves encryption on a level that provides good secrecy.

Problems arise if one tries to combine the concepts of network broadcasting and IPsec-based security. The broadcast address of a network segment does not identify anything that could be authenticated in the sense that setting up an SA would require. As a direct consequence it is impossible to set up an SA for the transmission of broadcast packets as they are presently known, which is another way of saying that IPsec-based security cannot be provided for the transmission of broadcast packets. In many security-conscious networks the use of IPsec is mandatory, which means that applications exploiting broadcast packets fail to operate over such networks.

SUMMARY OF THE INVENTION

It is an objective of the present invention to provide security and broadcast packet transmission capability simultaneously in a packet-switched communications network between computers. In more detail, it is an objective of the invention to provide methods, arrangements and software program products for securely transmitting and receiving broadcast type packets over such a network. A further objective of the invention is to ensure the secure transmission of broadcast type packets to and from mobile wireless terminals, as well as wired terminals making connections with a network segment in question through an arbitrary arrangement of insecure networks in between.

The objectives of the invention are achieved by conveying all broadcast packets that should be sent over IPsec-protected connections through a gateway that acts as a broadcast relaying station: it encapsulates and forwards the broadcast packets to the appropriate IPsec-protected connections.

According to a first aspect of the invention there is provided a method for handling a broadcast packet in a gateway computer that has an IPsec-protected connection to a part of a logical network segment within which the broadcast packet should be distributed. The IPsec protection specifies, what kinds of packets are acceptable for transmission over the IPsec-protected connection. The characteristic features of such a method are recited in the corresponding independent method claim.

According to a second aspect of the invention there is provided a method for transmitting a broadcast packet from a host computer, which host computer is part of a certain logical network segment within which the broadcast packet should be distributed and has an IPsec-protected connection to another part of the logical network segment. The IPsec protection specifies, what kinds of packets are acceptable for transmission over the IPsec-protected connection. The characteristic features of such a method are recited in the corresponding independent method claim.

According to a third aspect of the invention there is provided a method for conveying a broadcast packet from a first part of a logical network segment, within which the broadcast packet should be distributed, to a second part of the same logical network segment that has an IPsec-protected connection to the first part. The IPsec protection specifies, what kinds of packets are acceptable for transmission over the IPsec-protected connection. The characteristic features of such a method are recited in the corresponding independent method claim.

According to a fourth aspect of the invention there is provided a gateway computer for offering another computer device an IPsec-protected connection to and from a logical network segment within which the distribution of broadcast packets is allowable. The IPsec protection is arranged to specify, what kinds of packets are acceptable for transmission over an IPsec-protected connection. The characteristic features of such a gateway computer are recited in the corresponding independent device claim.

According to a fifth aspect of the invention there is provided a host computer, comprising means for establishing an IPsec-protected connection to and from a gateway computer of a logical network segment within which the distribution of broadcast packets is allowable. The IPsec protection is arranged to specify, what kinds of packets are acceptable for transmission over the IPsec-protected connection. The characteristic features of such a host computer are recited in the corresponding independent device claim.

According to further aspects of the invention there are provided a computer program product comprising a computer readable medium; a computer program element; a computer program element embodied on a computer readable medium; a computer readable medium, having a program recorded thereon; a computer program product directly loadable into the internal memory of a digital computer, comprising software code portions; as well as a computer program product stored on a computer usable medium. The characteristic features of these aspects of the invention involve making a computer implement a method according to some of the method aspects recited above.

Various embodiments of the invention are described in the depending claims.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

DETAILED DESCRIPTION OF THE INVENTION

Figure 1:
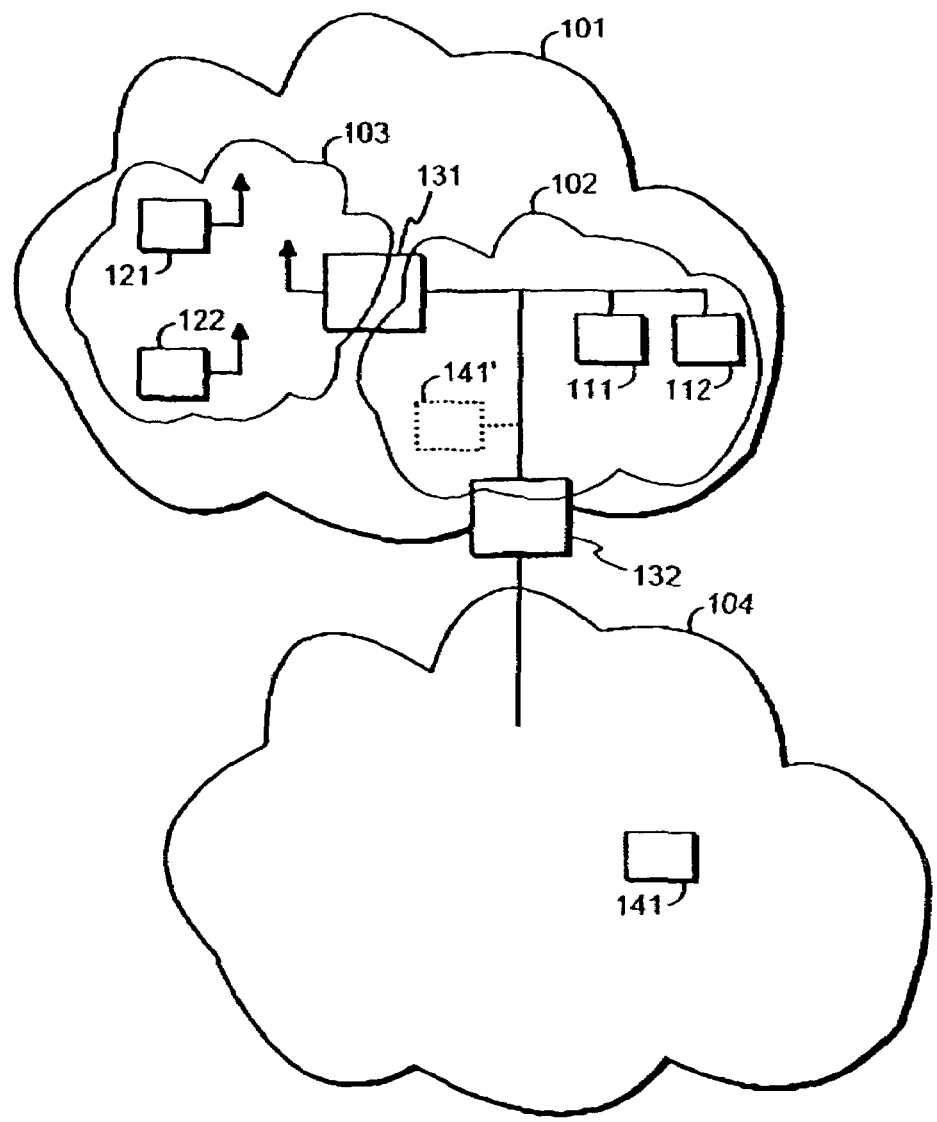
FIG. 1 illustrates how physically differently located devices may belong to a logical network segment.

FIG. 1 illustrates an arrangement where a logical network segment 101 consists of two physical network parts, which are a wired part 102 and a wireless part 103. Two exemplary hosts 111 and 112 are shown within the wired part 102; the actual number of hosts within the wired part 102 can be anything between only few and several thousands. Similarly two exemplary hosts 121 and 122 are shown as operating within the wireless part 103; also similarly the number of hosts within the wireless part may vary considerably and does not have any specific importance. Between the wired part 102 and the wireless part 103 there is a gateway 131, which for the purposes of the following description is specifically designated as a security gateway. Physically it belongs both to the wired part 102 and the wireless part 103. Between the logical network segment 101 and an outside wired network 104 there is a router 132, which we designate as a security router and which still belongs to the wired part 102.

As a practical example we may think that the logical network segment 101 is the LAN (Local Area Network) of a company. The wired hosts 111 and 112 are conventional desktop computers with a cable connection to the company LAN. The security gateway 131 is located in a conference room at the company's premises, where wireless access to the company LAN is offered to mobile workstations 121 and 122. The security router 132 implements a connection between the company LAN 101 and the Internet 104.

FIG. 1 illustrates additionally how a remote "road warrior" host 141 has been coupled to the logical network segment 101 through the outside wired network 104. Physically the remote host 141 may be located anywhere in the world; one of the tasks of the security router 132 is to mask this fact so that from the viewpoint of the other devices of the logical network segment 101 the remote host appears to be within the same network segment. The virtual apperance of the remote workstation 141 within the logical network segment 101 has been illustrated with dotted lines and reference designator 141'.

The wired part 102 of the logical network segment 101 is considered to be inherently safe, which means e.g. that hosts 111 and 112 may communicate with each other through the wired part 102 without using IPsec or other security measures comparable thereto. In clear contrast thereto the wireless part 103 is not inherently safe, because eavesdropping on wireless communications is relatively easy and because any arbitrary visiting host, friendly or hostile, may attempt registering into the wireless part 103. Also the outside wired network 104 is assumed to be unsafe. The word "security" in the designations of the gateway 131 and the router 132 emphasizes their responsibility for providing security to connections between "inside" hosts within the wired part 102 and "outside" hosts within either the wireless part 103 or the outside wired network 104. Using IPsec implies that SAs must be set up between each of the wireless hosts 121 and 122 and the security gateway 131, as well as between the remote host 141 and the security router 132.

For the purpose of providing a good understanding of the associated problems, we may briefly recapitulate the process of handling the IP addresses of the "dubious" hosts 121, 122 and 141. The security gateway 131 (or a separate address server coupled thereto) keeps a stock of dynamically allocatable IP addresses that are considered to belong to the internal address space of the logical network segment 101. When a wireless host registers into the wireless part 103 of the logical network segment 101, it gets one of these dynamically allocatable internal IP addresses for identifying itself during its stay. An ARP (Address Resolution Protocol) proxy functionality at the security gateway 131 takes care of handling any ARP queries from other hosts in the logical network segment 101: whenever there comes an ARP query that aims at finding out the machine address that corresponds to a certain IP address allocated to a wireless host, the security gateway 131 responds to the query by giving its own machine address. ARP is discussed in detail e.g. in the document Plummer, D.: "An Ethernet Address Resolution Protocol—or—Converting Network Protocol Addresses to 48.bit Ethernet Address for Transmission on Ethernet Hardware", RFC 826, Symbolics, Inc. November 1982.

The situation is similar if the remote host 141 would contact the logical network segment 101 through a telephone network, by making a direct call to a modem bank that constitutes a part of a security router. Also in that case the remote host gets an internal IP address for temporary use, and the security router takes care of the ARP proxy functionality. The arrangement of FIG. 1 resembles more a situation where the remote host 141 calls the modem bank of a local ISP (Internet Service Provider) at its current location and gets a temporarily allocated IP address from a stock of dynamically allocatable IP addresses kept by the ISP. For the purposes of making a connection to the security router 132 and applying IPsec-based security to the communication over such a connection the remote host uses this "external" IP address, where the address being external means that it does not belong to the internal address space of the logical network segment 101. Hosts within the logical network segment 101 would not recognize such an IP address as qualified for secure transmissions, so the security router 132 additionally allocates a dynamically allocatable internal IP address for the remote host. This "virtual" IP address is communicated to the remote host which uses its parallelly with the "real" IP address it received from the local ISP. Using virtual IP addresses is described in detail in an Internet Draft document "draft-ietf-ipsec-dhcp-13.txt", published in 2001 by the Internet Society, available at http://www.ietf.org/shadow.html and incorporated herein by reference.

Entrusting a router with the task of managing secure communications requires the router to have rather advanced capabilities. An alternative is to use a simpler router and to connect a security gateway to the wired part 102 of the logical network segment 101. Such a security gateway would act as the interface between secured communications towards the outside network 104 and inherently secure communications within the wired part 102.

Let us now consider what happens when one of the hosts 111 and 112 within the wired part 102 of the logical network segment 101 sends out a broadcast packet. All other hosts within the wired part 102 receive the broadcast packet without problems. Also the security gateway 131 and the security router 132 receive the broadcast packet. However, each IPsec-secured connection—from the security gateway 131 to the wireless host 121, from the security gateway 131 to the wireless host 122 and from the security router 132 to the remote host 141—is rigorously bound to the dynamically allocated IP address of the host in question and requires an SA for the transmission of packets. The network broadcast address in the broadcast packet cannot be used for identifying anything that could be authenticated, so without the measures of the present invention the broadcast packet that originated within the wired part 102 would not propagate to any of the wireless hosts 121 and 122 or the remote host 141.

For the sake of general interest we may also consider, what would happen if the security requirement on the wireless part 103 would be loosened to the extent of not requiring the use of IPsec. In that case the gateway 131 would just "shout out loud" the broadcast packet as it is, i.e. relay it from the wired medium to the wireless medium, and every wireless host in the wireless part 103 would receive it essentially simultaneously with their wired counterparts in the wired part 102. A corresponding general relaying function is not possible at the security router 132, because broadcast packets are only meant to propagate through the logical network segment 101 and relaying them out into the outside wired network 104 would violate this principle.

Figure 2:
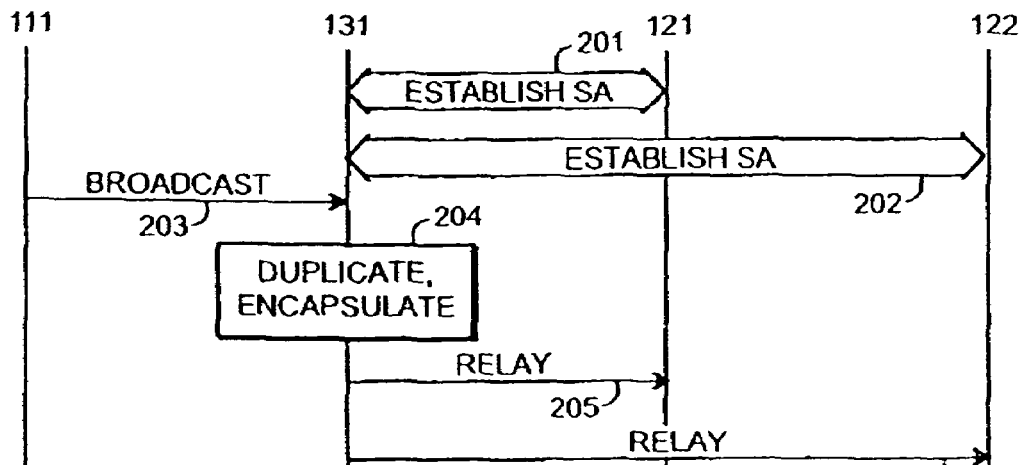
FIG. 2 illustrates a basic case of broadcast relaying according to an embodiment of the invention.

FIG. 2 illustrates the principle of secure broadcast relaying according to an embodiment of the present invention. The fact that certain wireless hosts are present in a wireless part of a packet-switched network already requires them to be on-line. In other words we may assume that at a certain time instant prior to the appearance of a broadcast packet there must have occurred the setting up of a security association between each wireless host and the security gateway, which security association has not yet expired when the broadcast packet comes. In FIG. 2 step 201 represents setting up an SA between the security gateway 131 and a first wireless host 121, and step 202 represents setting up an SA between the security gateway 131 and a second wireless host 122. These SAs are still alive when at step 203 a wired host 111 decides to transmit a broadcast packet through the logical network segment. At step 204 the security gateway 131 receives the broadcast packet, duplicates it into as many copies as there SA-connected wireless hosts, and encapsulates each copy appropriately so that it can be sent over the SA for which it was created. Transmitting the encapsulated copies of the broadcast packet to the wireless hosts may be designated as relaying, although it is not the exact copy of what the security gateway received but an encapsulated version thereof that is transmitted further. Step 205 represents relaying to the first wireless host 121 and step 206 represents relaying to the second wireless host 122.

Steps 201 and 202, i.e. the setting up of SAs that stand waiting for something to be transmitted from the gateway 131 to the wireless hosts, usually take place as a part of normal network traffic. It is possible, however, to make either the wireless hosts or the gateway or both execute a dedicated keepalive process the purpose of which is to ensure that an SA from the gateway to each wireless host always exists, if only the wireless host in question is otherwise in condition for standing by, waiting for transmissions from the gateway to occur.

Figure 3:
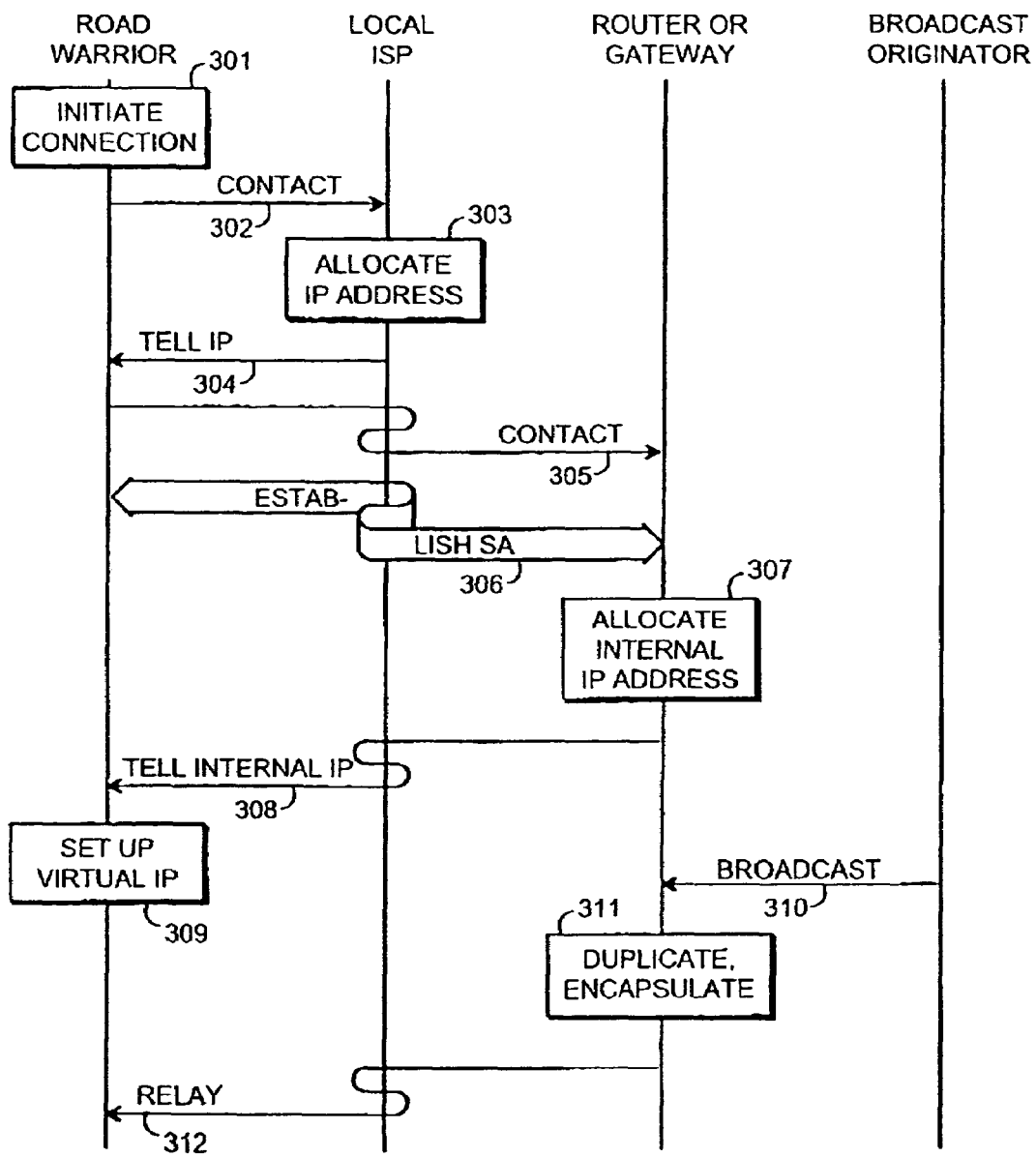
FIG. 3 illustrates broadcast relaying to a distant host according to an embodiment of the invention.

FIG. 3 illustrates a corresponding situation regarding a case where a distant host designated as the road warrior contacts the Internet through a local ISP at its current location and seeks contact with the secure network segment in which broadcast packets are expected to occur. At step 301 the distant host initiates the setting up of a network connection, and as a consequence thereof contacts the local ISP at step 302. At step 303 the local ISP provides the distant host with a temporary IP address, which it communicates to the distant host at step 304. Using this IP address and the connectivity services of the local ISP the distant host contacts the security router or security gateway of the secure network segment at step 305. An SA is set up between the security router or security gateway and the distant host at step 306. At step 307 the security router or security gateway allocates an internal IP address for the distant host (internal meaning internal to the secure network segment), which internal IP address is communicated to the distant host at step 308. At step 309 the distant host sets up a virtual network connection that uses the internal IP address it received. Up to this point the procedure may follow completely known measures; the present invention is not yet required to be involved.

At step 310 a broadcast originator in the secure network segment transmits a broadcast packet, so that the security router or security gateway is among the devices that receive said broadcast packet. At step 311 the security router or security gateway duplicates the broadcast packet and encapsulates it so that it can be transmitted through an SA to the distant host. The transmission or "relaying" of the encapsulated broadcast packet takes place at step 312.

Figure 4:
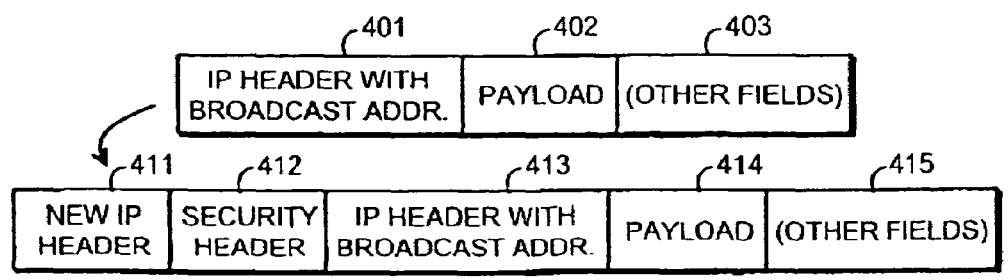
FIG. 4 illustrates the encapsulation of a broadcast packet for broadcast relaying according to an embodiment of the invention.

FIG. 4 illustrates briefly what happens at the step where a security gateway or a security router encapsulates a broadcast packet according to one part of the present invention for enabling its transmission through an SA to a wireless or distant host. Before encapsulation the packet is a normal IP packet, comprising an IP header 401, a payload field 402 and possibly some other fields 403. The IP header 401 comprises, among other values, the network broadcast address as a destination address value. Simple IPsec processing would preserve the original IP header and add a security header (an AH header or ESP header, where AH means Authentication Header and ESP means Encapsulating Security Payload) between the header and a payload field. Such processing is not applicable here, because the network broadcast address within the original IP header is not suitable for authenticating. Instead, the packet is transformed so that a new IP header 411 is added to the beginning of the packet, followed by the security header 412, the original IP header 413, the payload field 414 and the other fields 415, if they exist. The address values in the new IP header 411 are selected so that they match with the authenticated addresses of the endpoints of the SA through which the encapsulated broadcast packet is to be transmitted. Encryption of fields 413, 414 and 415 in the encapsulated packet is performed as per the definitions of the applied IPsec protection.

Figure 5:
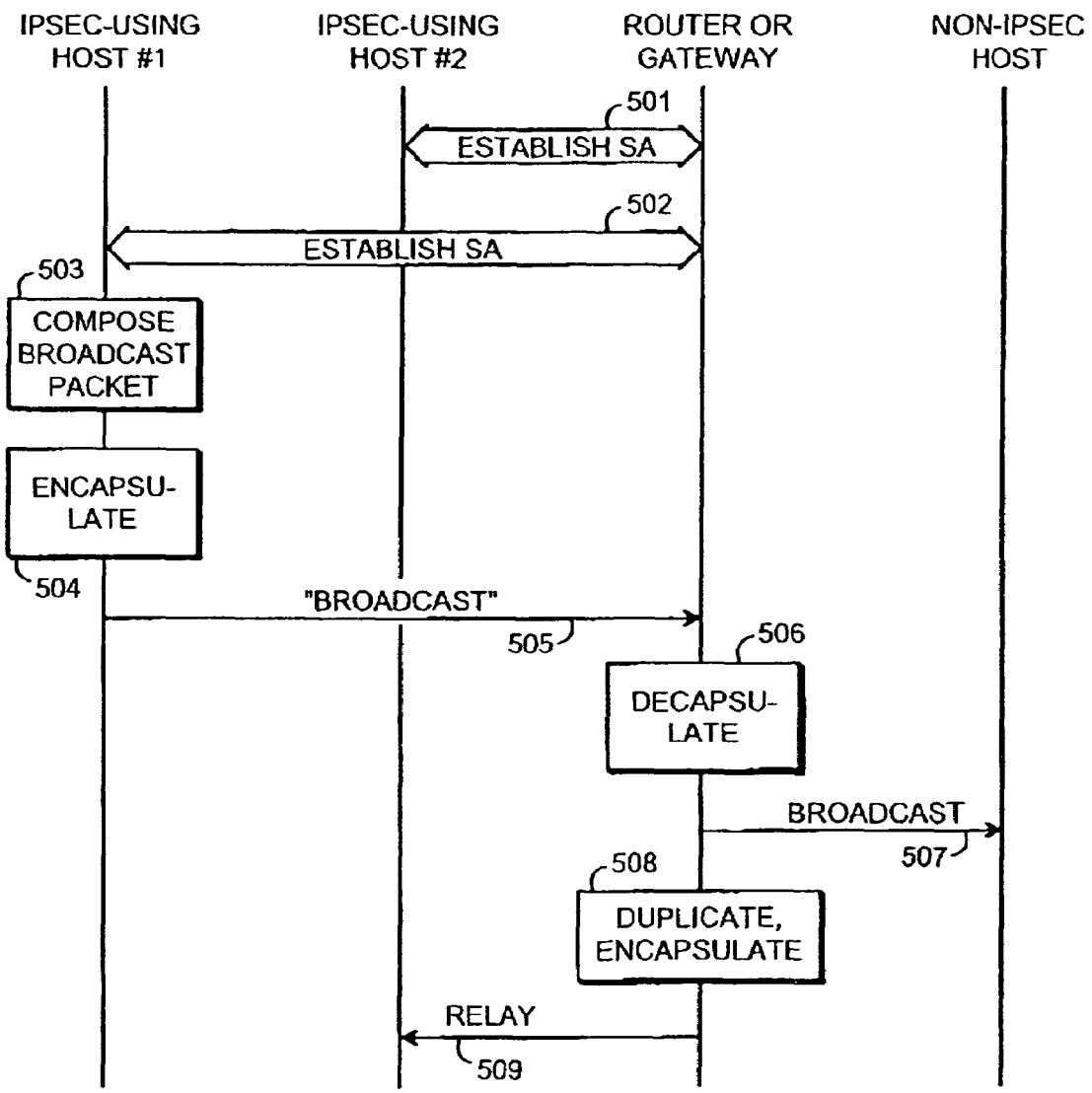
FIG. 5 illustrates broadcast relaying when the broadcast packet originates from a host with an IPsec-protected connection.

In the cases described so far we have assumed that the originator of the broadcast packet is connected directly to the secure, wired part of the logical network segment where broadcast packets occur. This is not necessarily true, since both wireless hosts—having a wireless, IPsec-protected direct connection to the secure network—and distant hosts that have IPsec-protected access the secure network through an insecure intermediate network may need to transmit broadcast packets as well. FIG. 5 illustrates how the invention is applied in such a case.

FIG. 5 is most readily applicable to a situation where two wireless hosts have IPsec-protected wireless connections to a security gateway, which is also a node of the secure wired network having wired hosts connected thereto. Steps 501 and 502 show how said wireless hosts have set up, at some previous moment, SAs between themselves and the security gateway. At step 503 one of the wireless hosts decides to transmit a broadcast packet, which is composes according to known measures. However, the wireless host cannot just transmit the broadcast packet to the security gateway through an SA because of authentication reasons that have already been described. Therefore the wireless host encapsulates the broadcast packet at step 504 so that it can thereafter transmit it to the security gateway at step 505. It should be noted that even if the packet itself is destined farther (i.e. to all hosts in the logical network segment) than the security gateway, steps 504 and 505 only aim at transmitting it through an SA the endpoint of which is at the security gateway. IPsec-based protective processing keeps any potential other wireless hosts within range from noticing that actually a broadcast packet came through the air—therefore the quotation marks around the word "broadcast" at step 505.

At step 506 the security gateway decapsulates the packet it received from the first wireless host and recognizes the content as including a broadcast packet. At step 507 it forwards the broadcast packet as it is into the wired part of the logical network segment. Additionally it must ensure that other such hosts that employ IPsec receive the broadcast. Therefore the security gateway duplicates the broadcast packet at step 508 into as many copies as there are other wireless hosts online at the moment, and encapsulates each copy appropriately so that it can be transmitted to the wireless host in question. At step 509 the security gateway relays the re-encapsulated broadcast packet(s) to all other wireless hosts than that from which the packet originally came from.

Only certain nuances of the procedure change if we consider cases where at least one of the IPsec-using hosts is a distant host communicating through an unsecure wired network or where there are at least two security gateways for wireless connections in the same network. If there are involved a first security gateway for wireless connections and a separate second security gateway or security router for distant connections or wireless connections in a separate location, the functionality shown in a single "router or gateway" column in FIG. 5 is split into two: one device receives the original encapsulated broadcast packet from the originator host and performs the decapsulating and forwarding functions, while the other receives the forwarded broadcast packet and performs the re-encapsulating and relaying functions.

It should be noted that certain types of packets may exist that could be considered as broadcast packets but the handling of which should nevertheless be different than what has been described above. Let us assume that a wireless host wants to broadcast an ARP request where it inquires the machine address of the security gateway or some other host that is "behind" the security gateway in the sense that the latter acts as an ARP proxy on behalf of the host in question. When the security gateway has decapsulated the ARP request packet, it notices that this is something that it can respond to exhaustively all by itself. In that case it does not need to forward the packet any further despite of its basic nature as a broadcast packet. It may respond directly to the host that sent the ARP request packet.

A special case could be considered where there is no "secure wired part" of a logical network segment at all, meaning that in no part of even the wired network can security be guaranteed and consequently IPsec must be employed in all connections. It is completely possible to use IPsec in a fabric-like network architecture where each node can communicate directly with each other node; it is then only required that separate SAs are set up for every peer-to-peer connection in the network. Hoever, the present invention does not work in such an environment unless at least one of two conditions is met. The first of these is that the network architecture is not completely fabric-like after all but there is a central node in the network. That knows how to receive a broadcast packet (encapsulated and through an SA) from its originator and how to de-encapsulate, duplicate and re-encapsulate the broadcast packet so that the central node can further relay the broadcast packets to all other devices in the logical network segment. The second possibility is that every node in the network is by itself able to convert the conventional procedure of releasing a broadcast packet into one where a number of SAs are successively set up between the originator and all other hosts in the logical network segment for transmitting a copy of the broadcast packet to every receiving device in turn.

Figure 6:
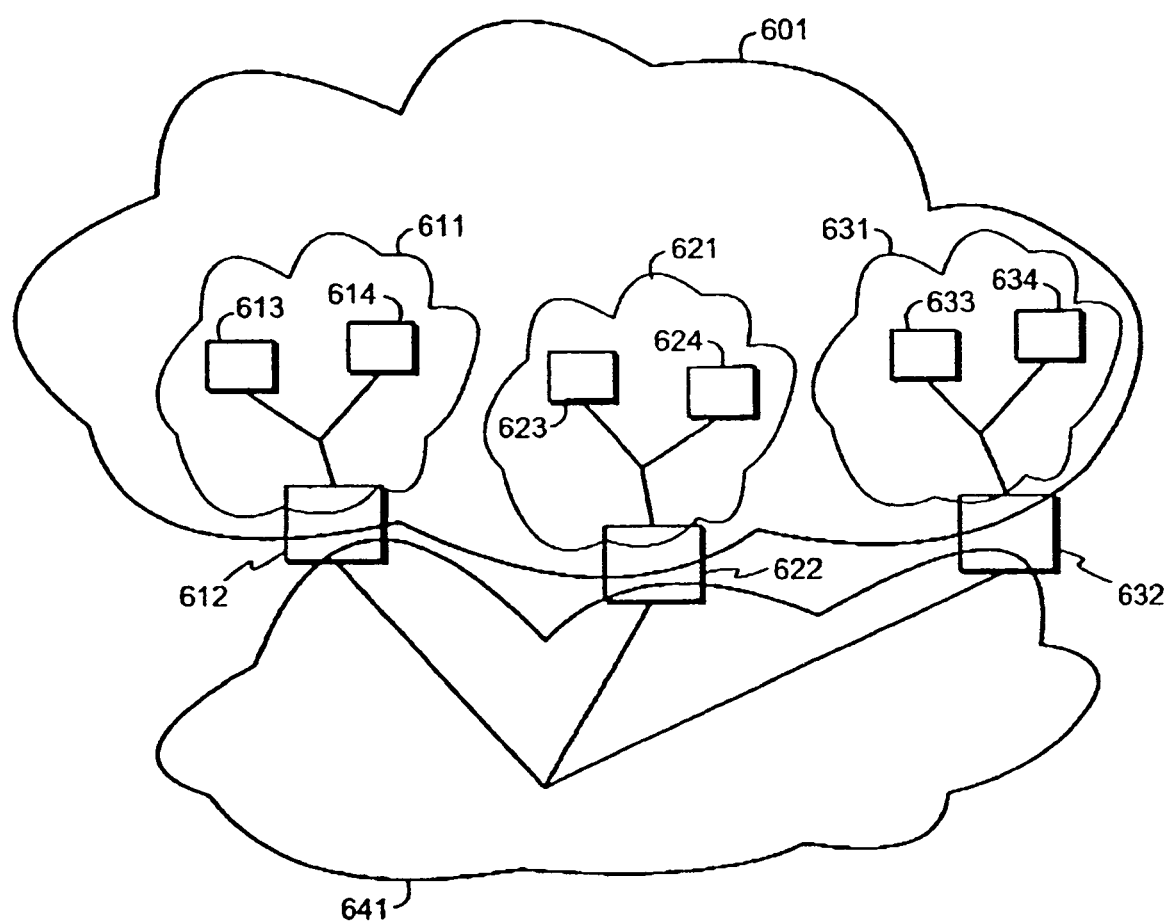
FIG. 6 illustrates the composition of a logical network segment from physically separate subnets.

FIG. 6 illustrates the application of the invention in a case where a logical network segment 601 consists of three different physical networks 611, 621 and 631, the connections between which go through an intermediate network 641 that does not belong to the logical network segment 601. The physical networks 611, 621 and 631 can also be designated as subnets. As a practical example we may consider that the logical network segment 601 is a corporate LAN of a company that occupies three different buildings. Connections between the buildings go through the public Internet and require IPsec protection, while within each physical network 611, 621 and 631 (inside the walls of each building) plaintext communication is allowed. For setting up and maintaining the protected connections between the subnets 611, 621 and 631 there is a security gateway or security router at each of them. In FIG. 6 these appear as the border routers 612, 622 and 632 respectively. The hosts that belong to each subnet are designated as 613 and 614; 623 and 624; as well as 633 and 634 respectively.

In order to fulfil their task of securely connecting the different subnets into a single logical network segment the security routers 612, 622 and 632 routinely maintain SAs between themselves. When now one of the host transmits a broadcast packet that should be distributed to all hosts of the logical network segment, the broadcast packet first appears in the subnet where the transmitting host is located. The security router of that subnet receives the broadcast packet, encapsulates it appropriately and transmits it to the other security routers through the SAs. Each receiving security router decapsulates the packet, recognizes it to be a broadcast packet and broadcasts it within the subnet in question.

Figure 7:
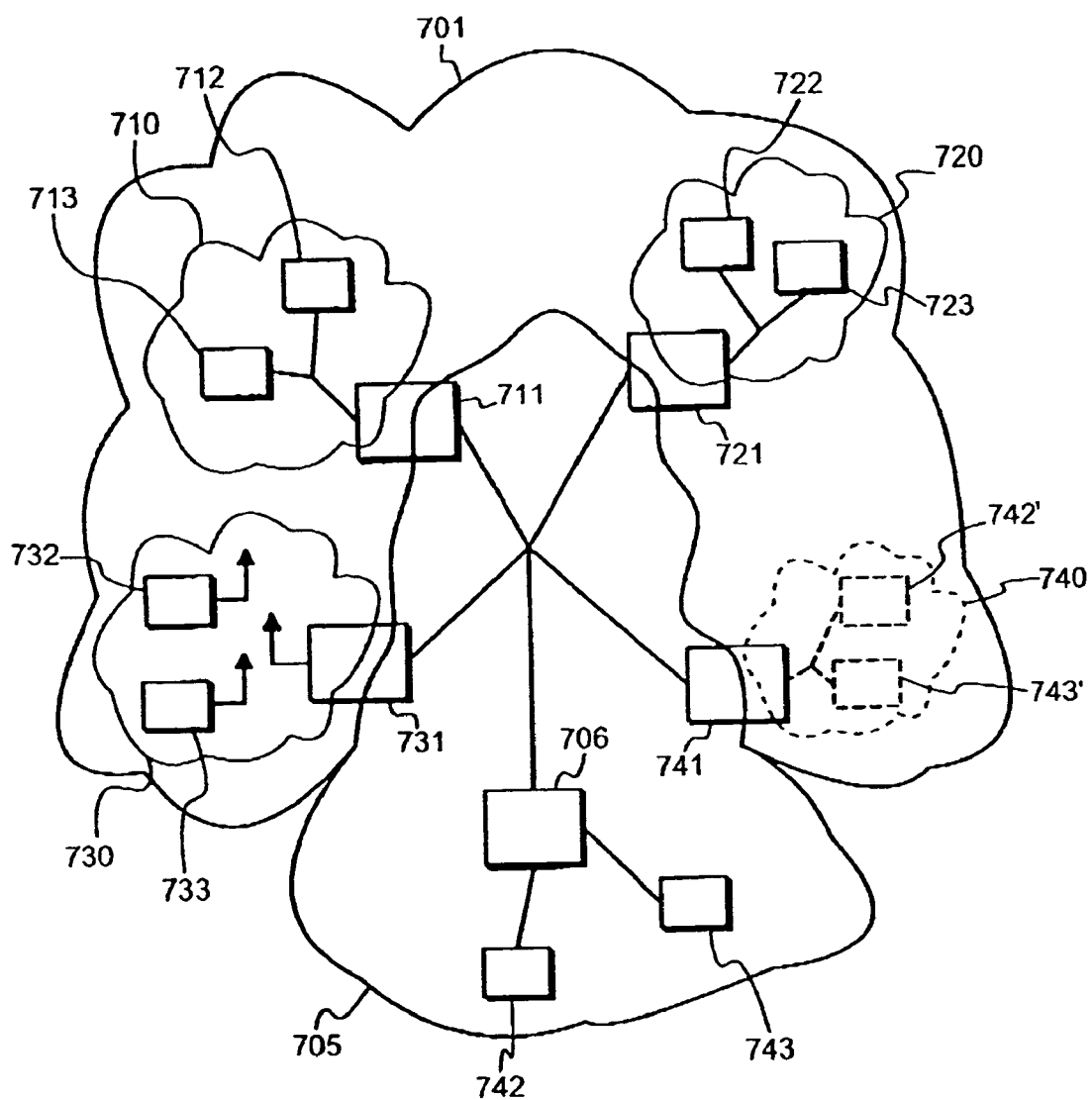
FIG. 7 illustrates a combination of several cases where the invention can be applied.

FIG. 7 illustrates a combination of many features that have been separately discussed above. A logical network segment 701 consists of several physically separate subnets, of which first and second subnets 710 and 720 are wired subnets, a third subnet 730 is a wireless subnet and a fourth subnet 740 is a virtual subnet where distant hosts are made to logically appear as hosts of the logical network segment 701. Security gateways 711, 721, 731 and 741 couple the various subnets to each other with connections that go through an inherently unsafe outside network 705. In the first subnet 710 hosts 712 and 713 are directly connected to the security gateway 711; similarly in the second subnet 720 hosts 722 and 723 are directly connected to the security gateway 721. In the third subnet 730 wireless hosts 732 and 733 have wireless connections to the corresponding security gateway 731, and in the fourth (virtual) subnet 740 the logical appearances 742' and 743' of certain hosts are seen to have connections to a security gateway 741. Actually the hosts 742 and 743 are located somewhere within the unsafe outside network 705, and connections from them to the security gateway 741 go through the server 706 of an ISP somewhere in the Internet.

Figure 8:
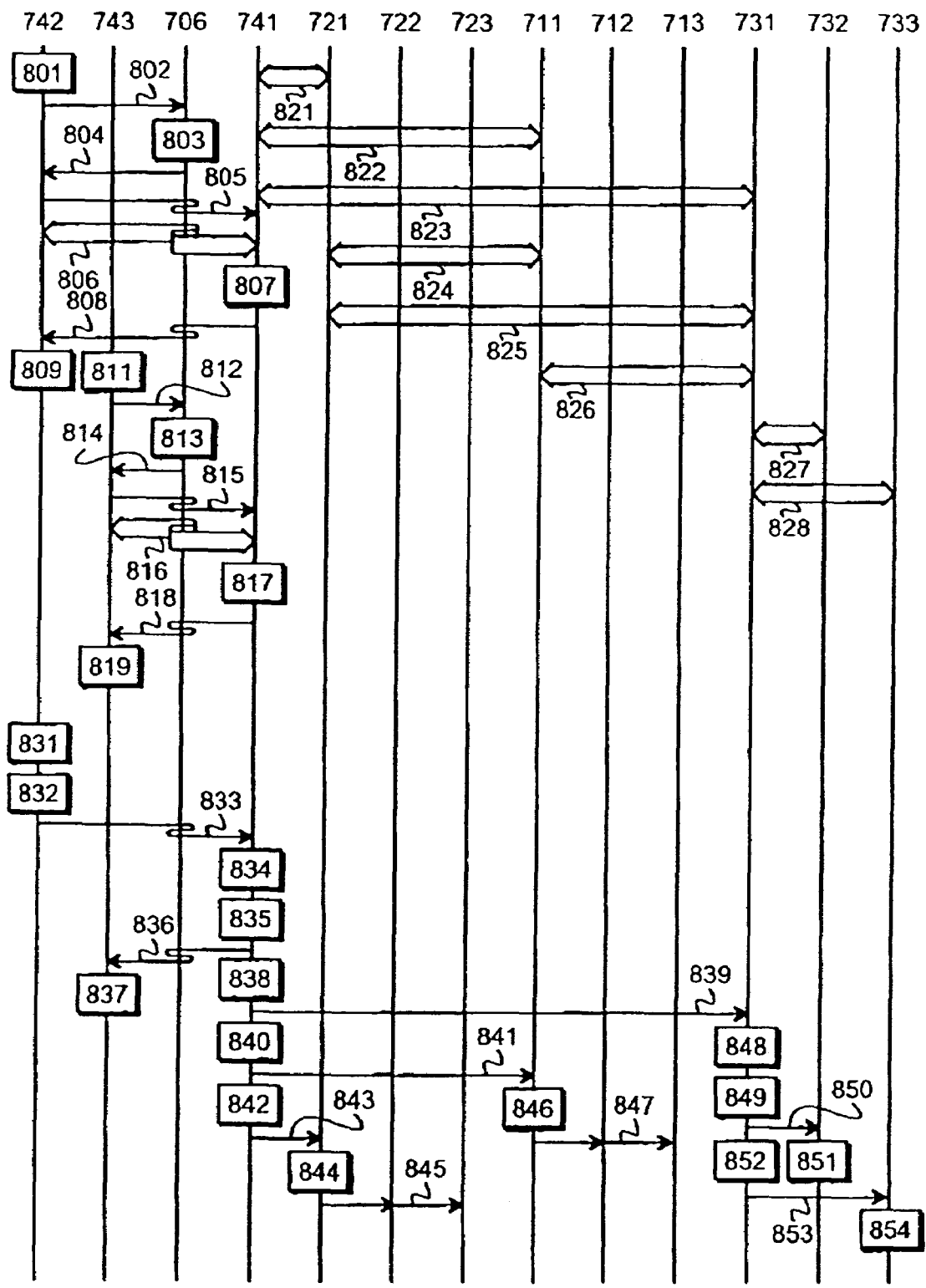
FIG. 8 illustrates one instance of broadcast relaying in the arrangement of FIG. 7.

FIG. 8 shows a chain of events that is related to the incident of a distant host transmitting a broadcast type packet in the logical network segment 701 illustrated in FIG. 7. At the top left part of FIG. 8 the distant hosts log in into the logical network segment 701. Regarding host 742, the associated steps are initiating 801 a connection, contacting 802 an ISP 706, allocation 803 of a temporary IP address at the ISP 706, communicating 804 the allocated temporary IP address to the host 742, contacting 805 the security gateway 741, setting up 806 an SA between the host 742 and the security gateway 741, allocating 807 a virtual IP address internal to the address space of the logical network segment, communicating 808 the allocated virtual IP address to the host 742 and setting up 809 a virtual IP connection at the host 742. Regarding host 743 the same operations are performed at steps 811, 812, 813, 814, 815, 816, 817, 818 and 819 respectively.

The various security gateways must also have set up SAs between themselves; this is shown in FIG. 8 as steps 821, 822, 823, 824, 825 and 826. Additionally the wireless hosts 732 and 733 in the wireless subnet must set up SAs between them and the wireless security gateway 731. Setting up the wireless SAs is shown in FIG. 8 as steps 827 and 828.

At step 831 a distant host 742 composes a broadcast packet. It cannot transmit it as such, so it encapsulates it at step 832 for transmission 833 over an appropriate SA to the security gateway 741. At step 834 the security gateway decapsulates the packet and notices that it is a broadcast packet on its way to all other devices in the logical network segment 701. There are only IPsec-protected connections from the security gateway 741 to the other parts of the logical network segment 701, so recognizing the packet as a broadcast packet triggers a series of re-encapsulation and transmission operations. The order in which the forwarding to the other parts of the network is performed is not important. As an example, in FIG. 8 the security gateway 741 first re-encapsulates 835 and transmits 836 the broadcast packet to the other distant host 743, which subsequently re-decapsulates the packet at step 837.

Other re-encapsulation and transmission operations follow at the security gateway 741: to the wireless security gateway 731 at steps 838 and 839, to the first wired security gateway 711 at steps 840 and 841, and to the second wired security gateway 721 at steps 842 and 843. The last-mentioned device re-decapsulates the broadcast packet at step 844 and forwards it as a single broadcast-type transmission 845 to the hosts 722 and 723 in the corresponding subnet. Similar re-decapsulating and forwarding operations take place at the first wired security gateway 711 at steps 846 and 847. At the wireless security gateway 731 there is a re-decapsulating operation at step 848, but the wireless security gateway 731 cannot simply forward the broadcast packet in a single transmission. Instead, it performs a second re-encapsulation at step 849 before transmitting 850 the packet to the first wireless host 732, which then again decapsulates the packet at step 851. Regarding the second wireless host 733 similar second re-encapsulating 852, transmitting 853 and second decapsulating 854 take place.

Figure 9:
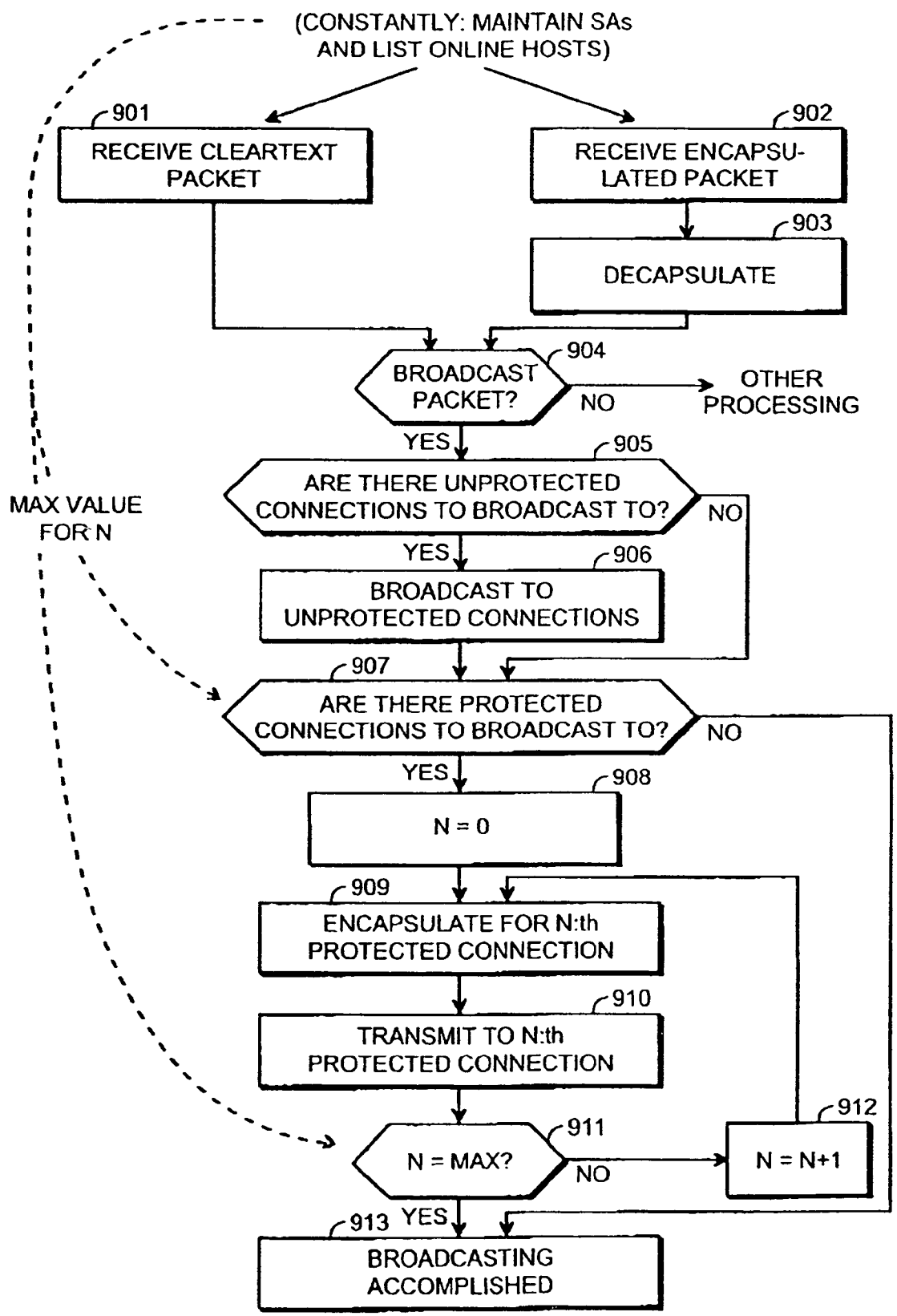
FIG. 9 illustrates a method according to an embodiment of the invention.

FIG. 9 illustrates a method according to an embodiment of the invention: the method in question is meant to be executed by a security gateway that may have protected and/or unprotected connections to other devices of a logical network segment and that should be able to handle broadcast packets. An IPsec-capable security gateway is expected to constantly maintain SAs to hosts that are online, as well as to keep a list of such hosts. The operation according to the method in FIG. 9 begins when the security gateway receives a packet either from an unprotected connection according to step 901 or from a protected connection according to step 902, in which latter case there is the inevitable decapsulating step 903. At step 904 the security gateway examines, whether the received packet was a broadcast packet. If not, the packet will be processed in some other way. In a positive case the security gateway checks at step 905, whether it has any unprotected connections into which it should forward the broadcast packet; naturally if the broadcast packet came through an unprotected connection, the security gateway will not transmit it again into the same connection. If appropriate unprotected connections are found, the security gateway forwards the packet into such connections at step 906. A negative finding at step 905 leads directly to step 907.

At step 907 the security gateway checks, whether it has any protected connections into which it should forward the broadcast packet. Again if the broadcast packet originally came through a protected connection, the security gateway will not transmit it again into the same connection. The number of protected connections into which the broadcast packet must be transmitted is obtained from the ever-updated list of such connections. At step 908 the security gateway initializes a counter N, after which it circulates the loop of encapsulating the broadcast packet for transmission at step 909, transmitting the encapsulated packet at step 910, checking the counter value at step 911 and increasing the counter value by one if needed at step 912, until the check at step 911 shows that all protected connections have been dealt with. An end state 913 follows; a direct jump to the end state 913 is also possible from step 907 if it is found there that no protected connections currently exist into which the packet should be transmitted.

Figure 10:
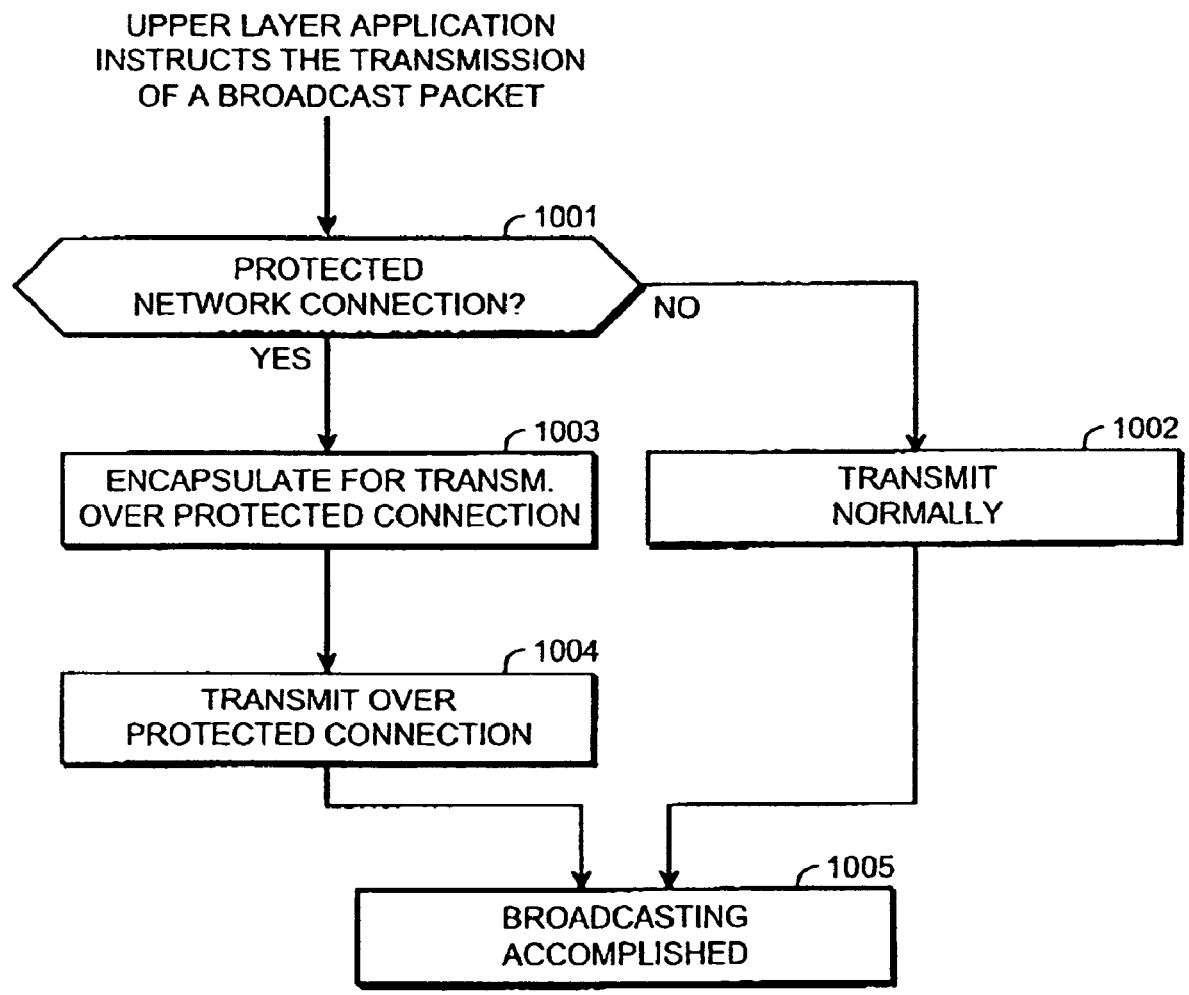
FIG. 10 illustrates a method according to another embodiment of the invention.

FIG. 10 illustrates a method to be executed by a host that may have either a protected or an unprotected network connection. When an upper layer application commands the transmission of a broadcast packet, the host checks first at step 1001, whether the current network connection is protected or not. If the network connection is unprotected, transmission of the broadcast packet proceeds according to known methods at step 1002. If, however, the network connection is found to be protected, the host encapsulates the broadcast packet at step 1003 for transmission over a protected connection, and transmits the encapsulated packet at step 1004. A broadcasting accomplished state 1005 follows either step 1004 or step 1002.

Certain special cases need to be considered. One of them is the situation of FIG. 1, where a logical network segment 1101 is extended to cover a separately located physical subnet 1102 so that there is a wireless connection between the subnet 1102 and the rest of the logical network segment, and additionally the subnet 1102 comprises wireless hosts. As an example we may think that the subnet 1102 is located in a rail car, while the basic parts of the logical network segment 1101 are stationary. A first wireless gateway 1111 is located in (or has a protected connection to) the stationary part of the logical network segment, and a second wireless gateway 1112 acts both as the common long distance transceiver of the whole rail car and as the local short-distance base station and network hub within the subnet 1102. Two wireless hosts 1113 and 1114 are shown in FIG. 11.

Figure 11:
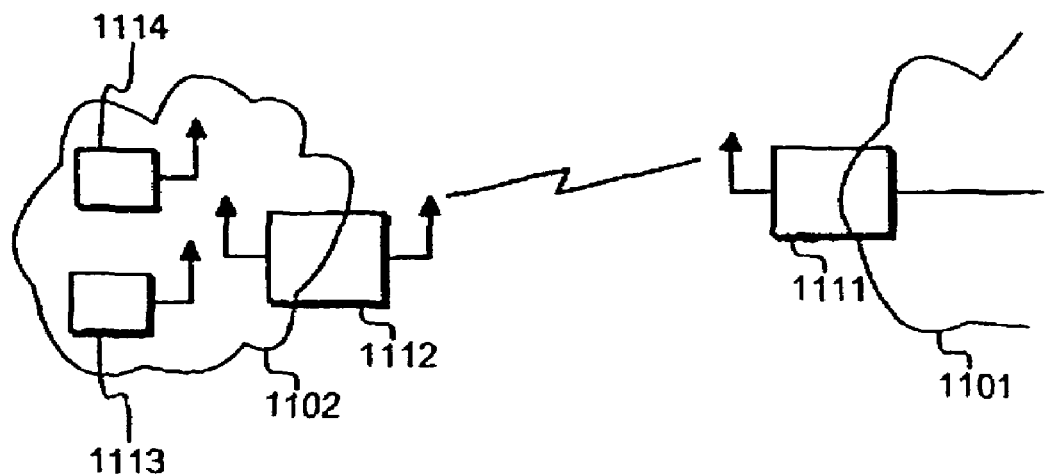
FIG. 11 illustrates chaining of IPsec-protected connections.

Transmitting broadcast packets according to the invention in the arrangement of FIG. 11 requires the chaining of two encapsulation—decapsulation rounds. If the broadcast packet originated within the fixed part 1101 of the logical network segment, the first wireless gateway 1111 encapsulates it first for transmission to the second wireless gateway 1112. The latter decapsulates the packet only to find out that it is a broadcast packet. Thereafter the second wireless gateway 1112 re-encapsulates and transmits the packet as many times as there are currently hosts online within the subnet 1102. In the other direction if the originator of the broadcast packet was one of the wireless hosts 1113 and 1114, the originator host encapsulates the broadcast packet for the first time before transmitting it to the second wireless gateway 1112. Again the last-mentioned decapsulates the packet only to find out that it is a broadcast packet, and re-encapsulates and transmits the packet as many times as there are currently other hosts online within the subnet 1102. Additionally the second wireless gateway 1112 re-encapsulates and transmits the packet to the first wireless gateway 1111, which decapsulates it and takes care of forwarding it as an ordinary broadcast packet into the fixed part 1101 of the logical network segment.

Figure 12:
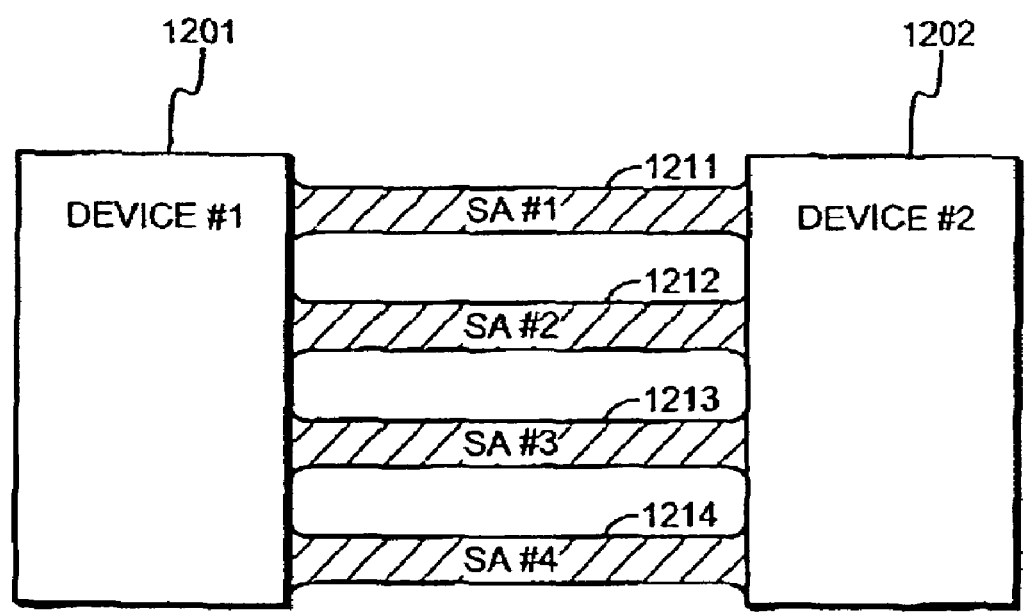
FIG. 12 illustrates the case of several simultaeously active SAs between two communicating devices.

Another special case concerns FIG. 12, where a first device 1201 and a second device 1202 have multiple currently active SAs 1211, 1212, 1213 and 1214 existing between them. If we now suppose that one of the devices 1201 and 1202 should relay a broadcast packet to the other, how should it select the SA through which the broadcast packet should be transmitted in encapsulated form? There are basically two possible solutions that differ in the basic viewpoint of which of the devices should contain more intelligence. The first alternative is to assume that every device that encapsulates broadcast packets for relaying is capable of selecting exactly one SA from each "bunch" of SAs that have the same destination. It is easy as such to provide a set of rules for performing such a selection: for example we may define that the transmitting device should always select that SA that is oldest (or newest) in the sense that it was established the longest (or shortest) time ago. Or we may utilize the fact that every SA has a well-defined lifetime either in time or in byte count or both, and state that always that SA should be selected that has more (or less) of its lifetime left than any other currently existing SA. Or we may simply state that the transmitting device should always select that SA that is encountered first (or last) on a list of SAs to a certain receiving device. Or we may allow the transmitting device to pick the SA at random. The only thing to watch out for is that the selected SA really terminates at the intended receiving device. It is well known that SAs may be nested within each other so that even if a certain outer SA terminates at a certain other device, an inner SA therewithin may continue further from that other device to yet another device.

The second basic alternative is to allow the transmitting device to ignore the fact that some of it currently active SAs actually terminate at a same receiving device. As a consequence the transmitting device simply duplicates, encapsulates and transmits the broadcast packet into each and every outgoing SA that is only known to terminate at a device that belongs to the logical network segment within which the broadcast packet is circulating. It is then on the responsibility of the receiving device to note that it may receive copies of the same broadcast packet through different incoming SAs. Again the practical implementation is simple as such: it is easy to make a receiving device store all received broadcast packets into a temporary buffer, so that it may compare a received broadcast packet to the contents of the buffer and to ignore all such received broadcast packets for which an exact copy already exists in the buffer. However, the first basic alternative is regarded as the more advantageous one, because it helps to avoid unnecessary delays that could result from superfluous duplicating and encapsulating at a security gateway. Additionally bandwidth is often scarce at a wireless interface, and transmitted byte count may be a basis for charging, so it is usually best to avoid unnecessary transmissions.

Figure 13:
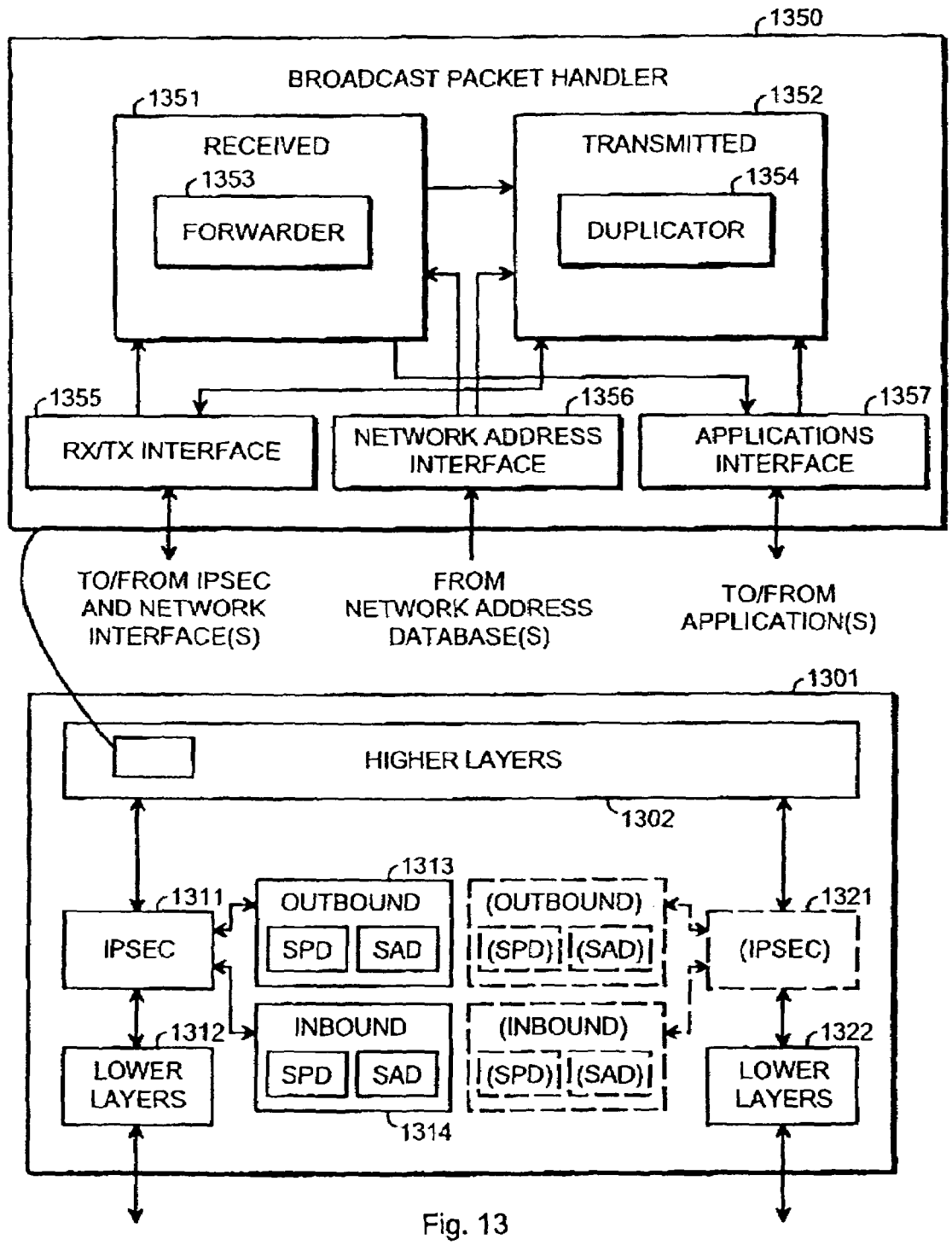
FIG. 13 illustrates a device implementation according to an embodiment of the invention.

We will conclude by describing certain device embodiments of the invention. FIG. 13 illustrates a computer device 1301 where a higher layers component 1302 schematically includes all such functionality that in the seven-layered OSI (Open Systems Interconnection) model are located at the IF layer or higher. We may assume that the computer device 1301 is a security gateway or an intelligent security router according to an embodiment of the invention. From the higher layers component 1302 there are two IP-based connections to other computer devices: one through a first IPsec component 1311 and the lower layers 1312 that are known to be used below the IP level, and the other through a second IPsec component 1321 and the lower layers 1322 that are known to be used below the IP level. In practice even security gateway devices seldom have more than one network interface where IPsec is enabled, because the "internal" network interface connects the security gateway to a secure internal network where IPsec is not needed. The double IPsec approach is shown in FIG. 13 for the purpose of completeness and to emphasize the fact that IPsec must be used whenever security must be provided to IP-based data communication. In the following we will only describe the leftmost interface in FIG. 13.

According to the requirements of the IPsec standard, each interface where IPsec is enabled must have certain databases associated with the IPsec component. These databases include a Security Policy Database (SPD) and a Security Association Database (SAD), which additionally must differentiate between inbound and outbound data traffic because of the directionality of many parameters associated with the SAs. In FIG. 13 the IPsec component 1311 is shown to have an outbound database block 1313 and an inbound database block 1314, each of which has an SPD part and an SAD part. For the purposes of the present invention the SAD part is the most important, because it provides the information about the SAs into which transmitted, encapsulated broadcast packets must be directed.

As a part of the higher layers component 1302 there is shown a broadcast packet handler 1350 that includes handling functions 1351 and 1352 for received and transmitted broadcast packets respectively. A major component of the received broadcast packets handling functions 1351 is a packet forwarder 1353 that is arranged to forward received broadcast packets to the applications that use these packets as well as to the transmitted broadcast packets handling functions 1352 to be transmitted further in encapsulated form into SAs. For the latter purpose the transmitted broadcast packets handling functions 1352 include a duplicator 1354 the task of which is to duplicate the broadcast packets for encapsulation into different SAs. An RX/TX interface 1355 forwards received broadcast packets both from IPsec-protected and from unprotected network interfaces to the broadcast packets handling functions 1351; it also forwards broadcast packets to be transmitted from the transmitted broadcast packets handling functions 1352 to IPsec-protected and unprotected network interfaces as required. A network address interface 1356 provides the handling functions 1351 and 1352 with the necessary information about currently valid network addresses. An applications interface 1357 forwards received broadcast packets to applications and conveys broadcast packet transmission orders from applications to the transmitted broadcast packets handling functions 1352.

A host implementation would be similar to that described above, with the exception that hosts very seldom have more than one network interface, which means that the lower right part within block 1301 (blocks 1321 and 1322 as well as the associated databases) can be ignored.

The invention claimed is:

1. A gateway computer (131, 132, 612, 622, 632, 711, 721, 731, 741, 1111, 1112, 1301) for offering another computer device an IPsec-protected connection to and from a logical network segment (101, 601, 701, 1101) within which the distribution of broadcast packets is allowable, wherein the IPsec protection is arranged to specify, what kinds of packets are acceptable for transmission over an IPsec-protected connection, characterized in that the gateway computer comprises:

means (1311, 1321) for encapsulating a broadcast packet into a form that is acceptable for transmission over an IPsec-protected connection, means (1312, 1322) for unicast transmitting the encapsulated broadcast packet to the other computer device through an IPsec-protected connection, a first network interface (1322) for connecting the gateway computer to a logical network segment comprising several computer devices, a second network interface (1312) for connecting the gateway computer to individual hosts for the purpose of making such individual hosts appear as parts of the logical network segment, an IPsec component (1311) coupled to the second network interface (1312) for implementing IPsec protection within connections through said second network interface, a broadcast packet handler component (1350), wherein the broadcast packet handler component is arranged to:

receive (1355) broadcast packets from either of the first (1322) and second (1312) network interfaces, forward (1353) received broadcast packets to application layer entities (1302) in the gateway computer, forward (1353) broadcast packets received from the first network interface (1322) towards the second network interface (1312), forward (1353) broadcast packets received from the second network interface (1312) towards the first network interface (1322), forward (1353) broadcast packets from application layer entities (1302) in the gateway computer towards the first and second network interfaces, and instruct the IPsec component (1311) regarding protected transmission of broadcast packets through the second network interface, characterized in that the broadcast packet handler component (1350) is additionally arranged to receive information (1355) from the IPsec component (1311) regarding the number and endpoints of currently existing IPsec-protected connections through the second network interface.

2. A host computer (121, 122, 141, 732, 733, 742, 743, 1113, 1114, 1301), comprising means (1311, 1312) for establishing an IPsec-protected connection to and from a gateway computer of a logical network segment within which the distribution of broadcast packets is allowable, wherein the IPsec protection is arranged to specify, what kinds of packets are acceptable for transmission over the IPsec-protected connection, characterized in that the host computer comprises:

means (1311) for encapsulating a broadcast packet into a form that is acceptable for transmission over the IPsec-protected connection, means (1312) for unicast transmitting the encapsulated broadcast packet to the gateway computer through the IPsec-protected connection, a network interface (1312) for connecting the host computer to a gateway computer, an IPsec component (1311) coupled to the network interface (1312) for implementing IPsec protection within connections through said network interface, and a broadcast packet handler component (1350), wherein the broadcast packer handler component is arranged to:

receive (1355) broadcast packets from the network interface, forward (1353) received broadcast packets to application layer entities (1302) in the host computer, forward (1353) broadcast packets from application layer entities (1302) in the host computer towards the network interface (1312), and instruct the IPsec component (1311) regarding protected transmission of broadcast packets through the network interface, characterized in that the broadcast packet handler component (1350) is additionally arranged to receive (1355) information from the IPsec component (1311) regarding the number and endpoints of currently existing IPsec-protected connections through the network interface.

* * * * *